United States Patent Office 3,044,919
Patented July 17, 1962

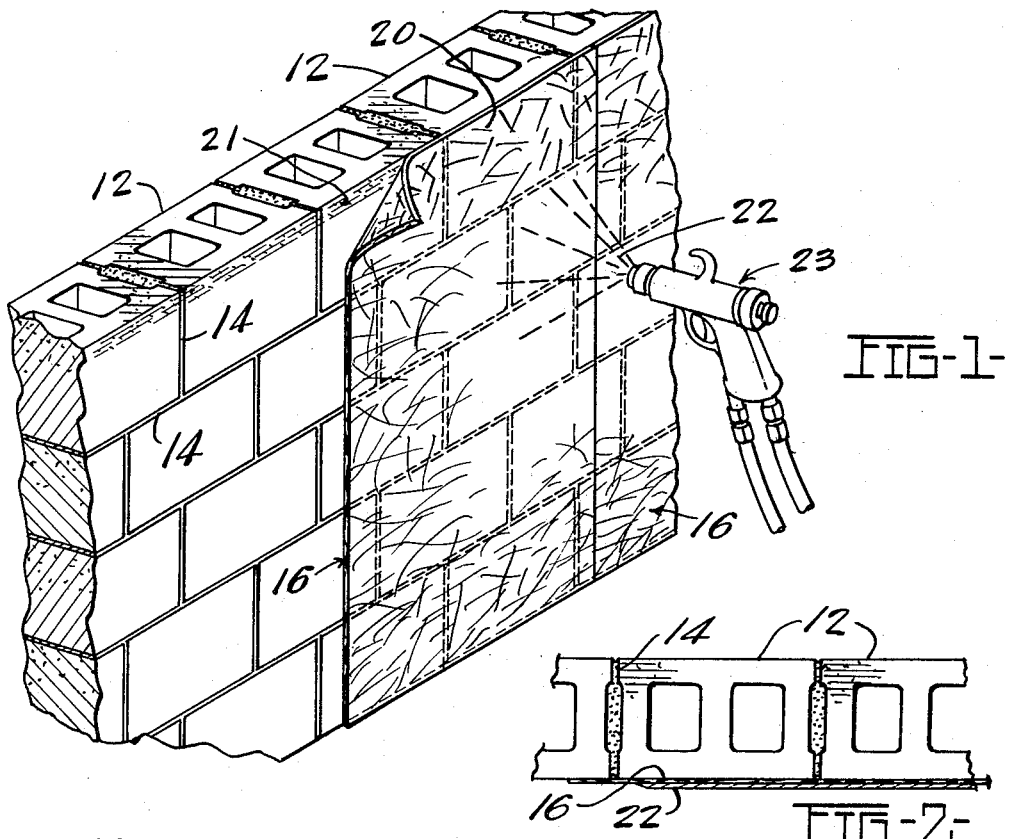
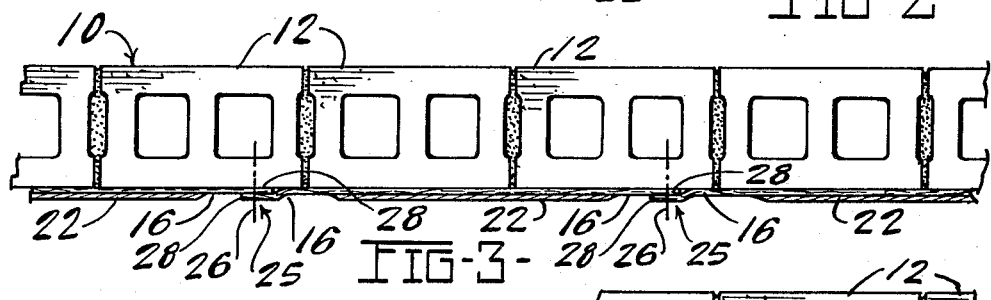
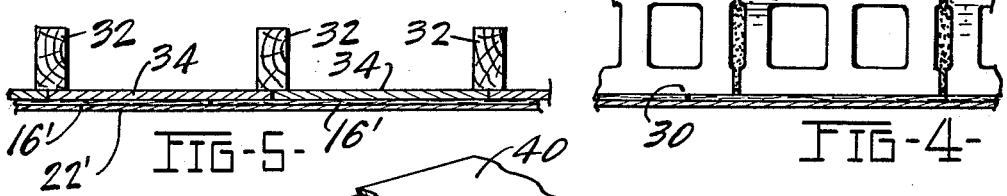
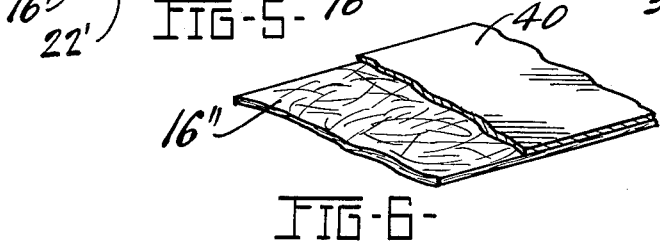

3,044,919
METHOD OF APPLYING FACING MATERIAL TO A WALL SURFACE
Chalmer S. Stoneburner, Newark, Ohio, assignor to Owens-Corning Fiberglas Corporation, a corporation of Delaware
Filed May 16, 1957, Ser. No. 659,601
11 Claims. (Cl. 156—71)

This invention relates to a surfacing or facing construction particularly adaptable for application on wall and ceiling areas or surfaces and to a method or system of applying the surfacing or facing to an area, the surfacing or facing construction embodying a thin mat, layer or sheet of mineral material adapted to be adhesively joined to the surface or area to be finished.

It has been conventional practice in fabricating and finishing walls and ceilings of rooms to apply plasterboard, gypsum board, fiberboard, plyboard or the like to form the walls or ceilings and where plasterboard or gypsum board is used, to coat the obverse surface with one or more layers of plaster to obtain a smooth surface area or areas which may be painted or papered depending upon the decorative motif desired. Other methods of fabricating wall surfaces have been employed but most satisfactory methods have heretofore necessitated the use of at least a finish coating or layer of plaster or a like material in order to eliminate seams and to attain an uninterrupted surface area which may be satisfactorily painted or otherwise decorated.

The renovation of interior walls of old buildings to attain smooth uninterrupted surfaces which may be satisfactorily finished or decorated have presented difficulties particularly where the surface areas abound with cracks and fissures which require filling before the surface can be painted or decorated. The task of filling fissures or cracks in a plastered surface is laborious and expensive and even with a most skilled reconditioning of such a surface, it is extremely difficult to obtain a satisfactory and presentable surface.

Another problem in the building construction industry is that of endeavoring to finish, paint or decorate a built-up wall formed of concrete or cinder block or other type of masonry to attain a presentable surface with a minimum of expense. Heretofore the methods employed to attain a finish surface for block walls have not been satisfactory and any form of finish has been comparatively expensive.

The present invention embraces a facing material or construction which is applicable to surface areas of any character, both interior and exterior, to provide a smooth surface requiring a minimum of conditioning to receive the facing or surfacing material.

An object of the invention is the provision of a method of facing or surfacing an area involving the steps of disposing comparatively thin mats or sheets of mineral fibers in contiguous relation with the wall, ceiling or area to be faced or surfaced and applying an adhesive or coating to the obverse face of the sheet or mat in a manner whereby the adhesive or coating material penetrates through the pores or interstices in the sheet or mat to adhesively secure or join the same to the wall, ceiling or other surface area to be faced.

Another object of the invention is the provision of a method of applying a finish facing or coating construction to interior or exterior walls or ceiling areas involving the steps of adhesively joining a comparatively thin mat of haphazardly arranged mineral fibers adjacent the wall or surface area by applying a decorative coating material, paint or adhesive to the mat to form an impervious coating or film providing a smooth, finished facing or surface wherein the mat of fibers reinforces the coating or adhesive providing a durable and lasting facing for walls and ceiling areas.

Another object of the invention is the provision of a method of applying a finish surface construction to interior or exterior walls and ceiling areas wherein mats or sheets of pervious character formed of haphazardly arranged mineral fibers such as glass fibers are disposed adjacent the wall or area to be faced or surfaced and an adhesive or paint projected under fluid pressure through the pores or interstices in the mats or sheets to adhesively join the same to the wall or area whereby the mats and the adhesive or paint form a smooth impervious finish surface.

Still another object of the invention is the provision of a method of surfacing areas and particularly wall areas provided by concrete blocks or masonry wherein strips or lengths of prebonded mat of mineral fibers are disposed in contiguous relation with the wall to be surfaced with the edge regions of the mats in overlapping relation, the overlapping regions cut or severed with a cutting instrument, the selvage or waste edge regions removed whereby the adjacent severed edges of the mats abut one another to form flush joints and a coating material applied to the obverse faces of the mats whereby a continuous uninterrupted finish surface is obtained.

Another object of the invention is the provision of a wall surfacing construction applicable for a variety of building materials comprising a thin mat of prebonded mineral fibers such as glass fibers impregnated or coated with a resinous paint, mastic or coating material which may be readily adhesively secured or joined to a wall or ceiling area to provide a finish facing or surfacing for the area.

Another object of the invention is the provision of a method of applying an adhesive or coating material to surface areas formed of wood, concrete, metal, masonry, plaster, wallboard or the like wherein the coating material is reinforced with a thin mat of haphazardly arranged mineral fibers providing a surfacing construction which may be employed in the fabrication of surface finishes of walls, both interior and exterior, and ceilings, the method being particularly adaptable and usable in providing a finish coating construction in renovating old wall surfaces.

Still another object of the invention is the provision of a facing construction which is readily adaptable for surfacing new walls or for refacing or renovating plastered walls to attain a finished decorative surface.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semi-diagrammatic isometric view of a wall construction formed of concrete blocks or the like illustrating the method of application of the surfacing construction of the invention;

FIGURE 2 is a plan view of a portion of the construction shown in FIGURE 1 illustrating the facing or surfacing construction applied to the concrete block wall;

FIGURE 3 is a sectional view through a concrete block wall construction illustrating sheets or mats of bonded mineral fibers with their edge regions in overlapping relation as a step in the method of forming a continuous smooth surface for the wall construction;

FIGURE 4 is a sectional view illustrating a further step in the method of securing a smooth uninterrupted finish surface;

FIGURE 5 is illustrative of the wall facing or surfacing construction of the invention applied to a conventional wallboard construction, and FIGURE 6 is a fragmentary isometric view illustrating the fiber-reinforced surface coating construction of the invention.

While the wall surfacing or facing construction of the present invention and the method of applying same to a wall area or surface wherein the surfacing construction embodies a comparatively thin sheet or mat of glass fibers, it is to be understood that sheets or mats of other types of fibers such as those formed from slag or fusible rock may be utilized as a facing or surfacing component of the construction.

The wall surfacing or facing construction has particular utility for attaining or forming a smooth finish surface on a wall formed of concrete or cinder block or other form of masonry construction where a substantially smooth uninterrupted surface or facing is desired without the use of a preliminary coating of material to fill up cracks, masonry joints or irregularities in the surface of the wall to be finished.

Referring to the drawings in detail and initially to FIGURES 1 through 4, there is illustrated a method of applying the surfacing construction of the invention to a wall fashioned of concrete blocks or the like. As shown in FIGURE 1, the wall construction 10 is of conventional construction built up of concrete blocks 12 joined together by cementitious material 14.

The method of the invention involves the positioning of comparatively thin mats or sheets 16 formed of mineral fibers such as glass fibers disposed in contiguous side-by-side relation with the surface of the block wall to be finished. The mats or sheets 16 are fashioned of comparatively fine glass fibers arranged in haphazard relation or orientation and are of pervious or porous character. Each mat or sheet of glass fibers is comparatively thin and preferably of from five thousandths of an inch to thirty thousandths of an inch in thickness, the fibers of the mat or sheet being prebonded together by a suitable bonding agent.

A feature of the invention involves the application of an adhesive, paint, mastic or coating material to the obverse face or surface of the bonded mat or sheet of mineral fibers in such a manner that the adhesive, paint, mastic or coating material penetrates through the interstices or pores in the mat to adhesively join the mat or sheet to the wall surface and concomitantly therewith impregnate the mat and form a surface or facing film which is substantially smooth and devoid of irregularities and wrinkles.

The mat may be formed in strips in widths of twenty-six inches, fifty inches or other desired dimension. In applying a sheet or mat of the material to a wall surface as shown in FIGURES 1 and 2, the upper edge region 20 of the mat or sheet is secured by a suitable adhesive 21 applied to the upper terminus of the concrete block wall to suspend the mat or sheet of mineral fibers in contiguous parallel relation with the vertical wall surface.

After a sheet or mat of fibers is thus positioned adjacent the wall, a suitable adhesive, coating material, mastic or paint is applied to the obverse face or surface region of the fibrous mat or sheet in a manner to effect a penetration of the adhesive or other material through the interstices or pores in the mat or sheet whereby the adhesive or other material projected through the mat engages the adjacent regions of the wall to join or adhere the mat to the wall surface.

The adhesive 22 applied to the face of the mat or sheet is preferably in the form of an emulsion or in a liquid state of a viscosity suitable for spraying onto the mat through the use of a spray gun or applicator 23. The applicator is connected with a supply of the adhesive or coating material and a source of fluid pressure such as compressed air for spraying the adhesive or coating material under pressure onto and through the interstices or pores in the fibrous mat.

The adhesive, paint, coating or impregnating material passing through the mat engages or contacts the surface of the wall 10 filling crevices or irregularities in the wall surface whereby the bonded mat provides a smooth uninterrupted facing for the wall surface. It is to be understood that the adhesive, coating or impregnating material may be applied by brushing or by rolling the same onto the obverse surface of the mat in such a manner that the adhesive or coating material penetrates through the mat to join or adhere the same to the wall surface.

The adhesive, paint or coating material fills up the pores or interstices in the mat and provides a pervious film of the adhesive, paint or other material on the obverse face of the mat of fibers. The film of the adhesive or coating material may provide the finish surface or the same may be additionally coated with paint or other decorative material if desired. The adhesive or coating material utilized to join the mat to the wall surface may be tinted or colored so as to provide a finished decorative surface on the face of the mat.

A suitable resin paint may be utilized as an adhesive and to provide a finish film on the bonded mat with or without an added decorative coating.

An emulsion type paint or coating containing latex, alkyd resin and suitable pigments has been found to be satisfactory for the purpose.

It has been found that polyvinyl acetate in a suitable emulsion or other liquid carrier or vehicle is effective to establish a tenacious bond between the mat and the supporting surface and provide a smooth impervious film on the obverse face of the mat. The polyvinyl acetate may be tinted and suffice as the finish surface for the mat or the obverse face of the impregnated mat may be painted if desired.

The strips of bonded mat may be applied with their adjacent edge regions in overlapping relation or they may be applied with the edges in abutting relation. While bonded mats or sheets of mineral fibers of various thicknesses may be utilized, it is of course desirable to employ as thin a mat as possible in order to minimize the amount of adhesive or coating material required to impregnate and adhere the mat to a wall surface.

The fibers of the bonded mat may be held together by a suitable bonding agent, the character of which may be dependent upon the wall surfaces to be finished in the manner above described. In installations subjected to moisture-laden atmosphere or where the walls may be moist or damp, it is desirable to employ a mat in which the fibers are bonded together with an agent which is unaffected by moisture. For example, the fibers of the mat may be bonded by a polyester resin or by a polystyrene resin or other suitable moisture resistant material. Where the bonded mat is utilized for facing or surfacing a wallboard or plastered surface or a so-called dry wall construction, the fibers may be bonded together by a starch binder or the like.

The bonded mat of mineral fibers forming a component of the finish for a wall surface performs several important functions. It provides or forms a smooth uninterrupted surface area, covering irregularities, cracks or fissures that may exist in the wall structure being finished. It functions as a reinforcing medium for the adhesive or paint and effectively eliminates or avoids peeling or cracking of the adhesive coating or paint.

The porous or pervious character of the fibrous mat provides for a substantial adhesion of the mat throughout substantially its entire area with the supporting surface and furthermore the mat provides dimensional stability, thus minimizing the liability of cracks or fissures occurring in the surface.

FIGURES 3 and 4 illustrate a method of applying sheets of bonded mat in side-by-side relation so as to readily and quickly obtain abutting or flush joints between adjacent strips of bonded mat. As particularly shown in FIGURE 3, the strips of bonded mat 16 are disposed in contiguous relation with an obverse face of the wall 10 fashioned of concrete blocks 12. The adjacent edge regions of the mat 16 are arranged in overlapping relation as indicated at 25.

In applying the mats in the manner illustrated in FIGURE 3, the central region of each of the mats 16 receives an application of adhesive 22 in the manner illustrated in FIGURE 1 or by brushing or rolling the adhesive or paint on the obverse faces of the mats to force the adhesive through the pores or interstices in the mats and adhesively join the central longitudinal regions to the wall 10. The overlapping regions 25 of adjacent mats may be severed, slit or cut by drawing a cutting blade or sharp instrument through both thicknesses of the overlapping mats at the lines indicated at 26.

After cutting through or severing the overlapping regions at the lines 26 throughout the length of the overlapping portions, the selvage or waste strips 28 are removed and the newly severed edge regions of adjacent mats mated or abutted form flush joints or seams 30, one of which is shown in FIGURE 4. Through this method, the edges of adjacent mats are in matched abutting relation without any gaps or spaces and with the obverse surfaces of the mats in the same plane presenting a smooth uninterrupted surface.

FIGURE 5 is illustrative of the facing or surfacing construction of the invention applied to a conventional wall or ceiling construction of a room. The studding of a wall is indicated at 32 which supports wall fabricating material 34 such as plaster, gypsum board, plyboard or any of the conventional wall fabricating materials.

The mats of mineral fibers 16' are disposed in contiguous relation with the obverse surfaces of the wall components 34 and arranged in side-by-side abutting relation as shown in FIGURE 4 or they may be arranged with their edge regions overlapping as shown in FIGURE 3 and the overlapping regions severed to form butt joints through the use of the method described in connection with FIGURES 3 and 4.

An adhesive, coating material, paint, or mastic 22' may be sprayed, brushed or rolled upon the obverse surfaces of the fibrous mats 16' causing the adhesive or other material to penetrate through the interstices or pores in the mat into contact with the surface of the wall components 34 to adhere the mats to the walls. It is desirable to apply a sufficient amount of the adhesive 22' or other material to the mats in order to form a thin film of adhesive on the faces of the mats.

If desired, the obverse faces of the adhesive-impregnated mat may be painted or other decorative coating applied thereto. The arrangement illustrated in FIGURE 5, applied through the herein described method, provides a smooth, uninterrupted surface without visible seams or joints which are covered or masked by the film of adhesive on the mats.

FIGURE 6 illustrates the surfacing construction in the form of an article of manufacture comprising a comparatively thin mat 16" of mineral fibers such as glass fibers bonded together and coated or impregnated with a coating material 40 as, for example, a coating of paint, preferably a resin paint of flexible character which will facilitate or enable forming the coated mat into rolls for ease of storage and shipping and to facilitate application to a wall surface in places where the above described method of application may not be practicable.

The coating-impregnated mat illustrated in FIGURE 6 may be applied to a wall surface by coating the reverse side of the mat 16" or the wall surface or panel to which the mat is to be applied, or both, and in this manner adhesively join strips or lengths of the mat to wall surfaces. The fibers of the mat 16" arranged in haphazard relation are prebonded together by a suitable bonding agent such as polyester resin, polystyrene resin, starch or other suitable material. The construction shown in FIGURE 6 provides a fiber-reinforced surfacing material which is dimensionally stable.

The facing or surfacing construction of the invention and the method of applying the same may be used on exterior as well as interior walls and are especially usable in renovating old walls and particularly plastered walls which have become checked, fissured or cracked, as the method of surfacing such walls in accordance with the invention obviates the necessity of filling the cracks or fissures prior to the application of the facing or surfacing construction. Any suitable rubber base or resin base paint may be utilized as a combined adhesive and finish coating material.

It is apparent that, within the scope of the invention, modifications and different arrangements may be made other than is herein disclosed, and the present disclosure is illustrative merely, the invention comprehending all variations thereof.

I claim:

1. A method of applying facing material to a wall surface including the steps of suspending a pervious mat of prebonded mineral fibers in contiguous relation with the wall surface by joining the upper edge region of the mat to the wall surface, and applying an adhesive to the obverse face of the mat whereby the adhesive is moved through the interstices in the mat to adhesively join the mat to the surface and form a coating of the adhesive on the obverse face of the mat.

2. A method of applying facing material to a planar wall surface including the steps of disposing a pervious sheet of haphazardly arranged bonded mineral fibers in contiguous relation with a surface, adhesively joining the upper edge region of the sheet to the wall surface to suspend the mat, and applying an adhesive to the obverse face of the suspended sheet whereby the adhesive is moved through the interstices in the sheet to adhere the sheet to the surface.

3. A method of applying a facing to a flat building wall surface including the steps of disposing a comparatively thin pervious mat of bonded unwoven mineral fibers in contiguous relation with the surface to be faced, adhesively joining the upper edge region of the mat to the surface to suspend the mat, and projecting an adhesive coating material under pressure through the mat whereby the material penetrates the interstices in the mat to adhesively join the entire area of the mat to the surface.

4. A method of forming a reinforced coating on a building wall surface including the steps of suspending a comparatively thin pervious mat of glass fibers in contiguous relation with the wall surface by a narrow strip of paint applied to the wall surface, and spraying paint under fluid pressure into the mat whereby the paint penetrates through the interstices of the mat to adhere the entire area of the mat to the surface and form a finish coating on the obverse face of the mat.

5. The method of surfacing a building wall panel including the steps of suspending a comparatively thin pervious mat of bonded haphazardly arranged mineral fibers in contiguous relation with the wall panel by joining the upper edge region of the mat to the panel, and forcing an adhesive coating material through the mat to adhesively join the mat to the panel and embed the mat in the material.

6. A method of forming a facing on a building wall surface including suspending a pervious sheet of bonded unwoven mineral fibers of a thickness between five thousandths of an inch and thirty-thousandths of an inch in contiguous relation with the wall surface by joining the upper edge region of the sheet with the surface, and applying paint to the obverse face of the sheet whereby the paint penetrates through the sheet and joins the entire area of the sheet to the wall surface.

7. A method of applying a reinforced coating to a wall surface including the steps of suspending a comparatively thin pervious sheet of bonded haphazardly arranged mineral fibers in contiguous relation with the surface to be coated by joining the upper edge region of the sheet with the wall surface by an adhesive material, and applying polyvinyl acetate onto the obverse face of the sheet whereby the polyvinyl acetate penetrates through the interstices in the sheet to adhesively join the sheet to the surface.

8. A method of applying a finish to a flat wall surface including the steps of suspending a pervious comparatively thin mat of haphazardly arranged bonded glass fibers in contiguous relation with the flat wall surface by securing the upper edge region of the mat to the surface by an adhesive, holding the fibrous mat in contact with the surface, and painting the obverse face of the mat to flow the paint through the interstices in the mat and adhesively secure the mat to the flat surface throughout its entire area by the adhesion of the paint.

9. A method of applying a finish to a building wall surface including the steps of suspending a comparatively thin pervious mat of prebonded glass fibers in contiguous parallel relation with the wall surface by a strip of paint between the upper edge region of the mat and the wall surface, holding the fibrous mat in contiguous relation with the wall surface, and applying paint having adhesive characteristics to the obverse face of the mat to force the paint through the interstices in the mat to adhesively secure the mat to the wall surface throughout its entire area.

10. A method of applying a finish to a building wall surface by the successive application of strips of comparatively thin pervious mat of haphazardly arranged glass fibers prebonded together including the steps of bringing a strip of mat into contiguous contacting relation with a flat surface, holding the upper edge region of the strip of mat in contact with the flat surface by an adhesive, applying a paint having adhesive characteristics to the obverse face of the strip of mat to project the paint through the interstices therein and thereby secure the strip of mat throughout its area to the wall surface, disposing another strip of mat in contiguous relation with the flat surface in partial overlapping relation with the applied strip, holding the upper edge region of the succeeding strip of mat in contact with the flat surface by an adhesive, applying paint to the obverse face of the succeeding strip to project the paint through the interstices in the strip to secure the entire area of the same to the flat surface, slitting the overlapping portions lengthwise of the strips, and removing the severed portions whereby the adjacent edges of the applied strips of mat form a smooth butt joint.

11. A method of applying a finish to a building wall surface by the successive application of strips of comparatively thin pervious mat of unwoven glass fibers wherein the fibers are prebonded together including the steps of bringing a strip of mat into contiguous contacting relation with a wall surface, adhesively joining the upper edge region of the strip of mat to the wall surface, applying paint to the obverse face of the strip of mat to project the paint through the interstices therein and thereby secure the strip of mat throughout its area to the wall surface by the adhesive characteristics of the paint, successively disposing individual strips of mat in contiguous relation with the wall surface with each succeeding strip in partial overlapping relation with the previously applied strip, adhesively joining the upper edge region of each succeeding strip of mat to the wall surface, successively applying paint to the obverse face of each strip to adhesively and successively secure each strip of mat throughout its area to the wall surface, slitting the overlapping portions of adjacent strips of mat lengthwise of the strips, and removing the severed portions whereby the contiguous severed edges of the applied strips form smooth butt joints.

References Cited in the file of this patent

UNITED STATES PATENTS

| | | |
|---|---|---|
| 35,526 | Kingman | June 10, 1862 |
| 2,391,515 | Richards et al. | Dec. 25, 1945 |
| 2,417,586 | Crosley | Mar. 18, 1947 |
| 2,556,476 | Lamport | June 12, 1951 |
| 2,561,449 | Ruderman | July 24, 1951 |
| 2,577,205 | Meyer et al. | Dec. 4, 1951 |
| 2,596,184 | Sutton | May 13, 1952 |
| 2,688,580 | Fingerhut | Sept. 7, 1954 |
| 2,695,257 | Castellani | Nov. 23, 1954 |
| 2,698,260 | Meauze et al. | Dec. 28, 1954 |
| 2,752,275 | Raskin et al. | June 26, 1956 |

FOREIGN PATENTS

| | | |
|---|---|---|
| 406,505 | Great Britain | Mar. 1, 1934 |
| 159,106 | Australia | Sept. 29, 1954 |

OTHER REFERENCES

"In Place of Felt . . . Fiberglass Mat," Miller, American Roofer, December 1946, pages 12, 13 and 25–28.

Delmonte: Concrete, June 1949, pages 12 and 45.

Gigliotti: Progressive Architecture, February 1956, pages 138–141.